United States Patent
Kozloski et al.

(10) Patent No.: US 11,205,127 B2
(45) Date of Patent: Dec. 21, 2021

(54) COMPUTER PROGRAM PRODUCT FOR SENSORY STIMULATION TO AMELIORATE A COGNITIVE STATE

(71) Applicant: International Business Machines Corporation, Armonk, NY (US)

(72) Inventors: James Robert Kozloski, Yorktown Heights, NY (US); Jason William Silbergleit, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 636 days.

(21) Appl. No.: 15/418,827

(22) Filed: Jan. 30, 2017

(65) Prior Publication Data
US 2018/0218268 A1     Aug. 2, 2018

(51) Int. Cl.
G06N 5/04     (2006.01)
G06N 3/00     (2006.01)

(52) U.S. Cl.
CPC .............. *G06N 5/04* (2013.01); *G06N 3/008* (2013.01)

(58) Field of Classification Search
CPC ................................ G06N 5/04; G06N 3/008
See application file for complete search history.

(56) References Cited

U.S. PATENT DOCUMENTS

| | | | |
|---|---|---|---|
| 7,930,199 B1 * | 4/2011 | Hill ..................... | G06F 16/5854 705/7.29 |
| 9,308,446 B1 | 4/2016 | Merzenich et al. | |
| 2009/0024504 A1 * | 1/2009 | Lerman .................. | G06Q 40/00 705/35 |
| 2009/0055019 A1 * | 2/2009 | Stiehl ..................... | B25J 9/1656 700/249 |
| 2011/0055720 A1 * | 3/2011 | Potter ..................... | G06F 3/017 715/747 |

(Continued)

FOREIGN PATENT DOCUMENTS

WO     WO-2016142351 A1 *   9/2016   ............. G06N 20/00

OTHER PUBLICATIONS

Patrizia et al., "A Robotic Toy for Children with [S]pecial [N]eeds: From [R]equirements to Design," in 2009 IEEE Int'l Conf. Rehabilitation Robotics 918-23 (2009). (Year: 2009).*

(Continued)

*Primary Examiner* — Kamran Afshar
*Assistant Examiner* — Ryan C Vaughn
(74) *Attorney, Agent, or Firm* — Peter Edwards, Esq.; McGinn I.P. Law Group, PLLC

(57) ABSTRACT

A cognitive state amelioration method, system, and computer program product, include predicting a cognitive state of a user based on at least one of a plurality of inputs including a physiological state of the user, a gesture of the user, a speech pattern of the user, and an internal state status of the user received from a second user, performing an ameliorating action to treat the cognitive state of the user when the predicting predicts a negative type of the cognitive state, and learning an effectiveness of the ameliorating action for treating the negative type of the cognitive state for the predicting to predict a different cognitive state, thereby to dictate a different ameliorating action to treat the different cognitive state more effectively.

4 Claims, 4 Drawing Sheets

(56) References Cited

U.S. PATENT DOCUMENTS

| | | | |
|---|---|---|---|
| 2013/0078600 A1 | 3/2013 | Fischer et al. | |
| 2014/0059066 A1* | 2/2014 | Koloskov | G06F 16/40 707/758 |
| 2014/0172431 A1* | 6/2014 | Song | G06F 16/433 704/275 |
| 2015/0313529 A1* | 11/2015 | Nevo | A61B 5/22 600/595 |
| 2016/0008629 A1 | 1/2016 | Ribbing et al. | |
| 2016/0030834 A1 | 2/2016 | Brown et al. | |
| 2016/0055420 A1* | 2/2016 | Karanam | A61B 5/165 700/52 |
| 2016/0234595 A1* | 8/2016 | Goran | G05B 15/02 |
| 2017/0255689 A1* | 9/2017 | Khatravath | G06F 16/24578 |

OTHER PUBLICATIONS

Sefidgar et al., "Design and Evaluation of a Touch-Centered Calming Interaction with a Social Robot," in 7.2 IEEE Transactions on Affective Computing 108-21 (2016). (Year: 2016).*

Stiehl et al., "The Huggable: A Platform for Research in Robotic Companions for Pediatric Care," in Proc. 8th Int'l Conf. Interaction Design and Children 317-20 (2009). (Year: 2009).*

Mel, et al. "The NIST Definition of Cloud Computing". Recommendations of the National Institute of Standards and Technology. Nov. 16, 2015.

Saadatzi et al. "Towards an affective computing feedback system to benefit underserved individuals: an example teaching social media skills". International Conference on Universal Access in Human-Computer Interaction. Springer Berlin Heidelberg, 2013.

Aravindan, "Design of Soft Tangible User Interface with Haptic Feedback to Help Children With Autism."Diss. Texas A&M University, May 2016.

Pineda et al.."Improving Synchronization and Functional Connectivity in Autism Spectrum Disorders Through Plasticity-Induced Rehabilitation". California Univ San Diego La Jolla Dept of Cognitive Science, 2013.

Mills et al., "Use of an In-Class Sensory Activity Schedule for a Student with Autism: Critical Case Study." Creative Education 7.07 (May 24, 2016): 979-989.

Hyatt et al., "A review of three controversial educational practices: Perceptual motor programs, sensory integration, and tinted lenses." Education and Treatment of Children vol. 32.No. 2 (2009): 313-342.

* cited by examiner

COMPUTER PROGRAM PRODUCT FOR SENSORY STIMULATION TO AMELIORATE A COGNITIVE STATE

BACKGROUND

The present invention relates generally to a cognitive state amelioration method, and more particularly, but not by way of limitation, to a system, method, and computer program product for using sensory stimulation to ameliorate a negative cognitive state of a user.

Conventionally, robots have been provided to sense aspects of behavior in circumstances, including behaviors associated with an autistic spectrum. The robots can be equipped to stimulate behaviors, sense response parameters, and perform therapeutic actions, under control of an operator.

However, the conventionally controlled robots do not include training a machine learning component to recognize and predict a change in a cognitive state of the user, and to provide remotely outputs from a device, such as a robot, or robotically-enabled furniture, to the individual that can have a therapeutic consequence, given that predicted (or learned) subjective state.

Therefore, there is a need in the art for predicting cognitive states by the individual (subjective) inputs or by an observer (external/objective) that can be coupled to the mapping for added specificity to deliver sensory input to treat a negative cognitive state.

SUMMARY

In an exemplary embodiment, the present invention can provide a computer-implemented cognitive state amelioration method, the method including predicting a cognitive state of a user based on at least one of a plurality of inputs including a physiologic state of the user, a gesture of the user, a speech pattern of the user, and an internal state status of the user received from a second user, performing an ameliorating action to treat the cognitive state of the user when the predicting predicts a negative type of the cognitive state, and learning an effectiveness of the ameliorating action for treating the negative type of the cognitive state to predict a different cognitive state to dictate a different ameliorating action to treat the different cognitive state more effectively.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and capable of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
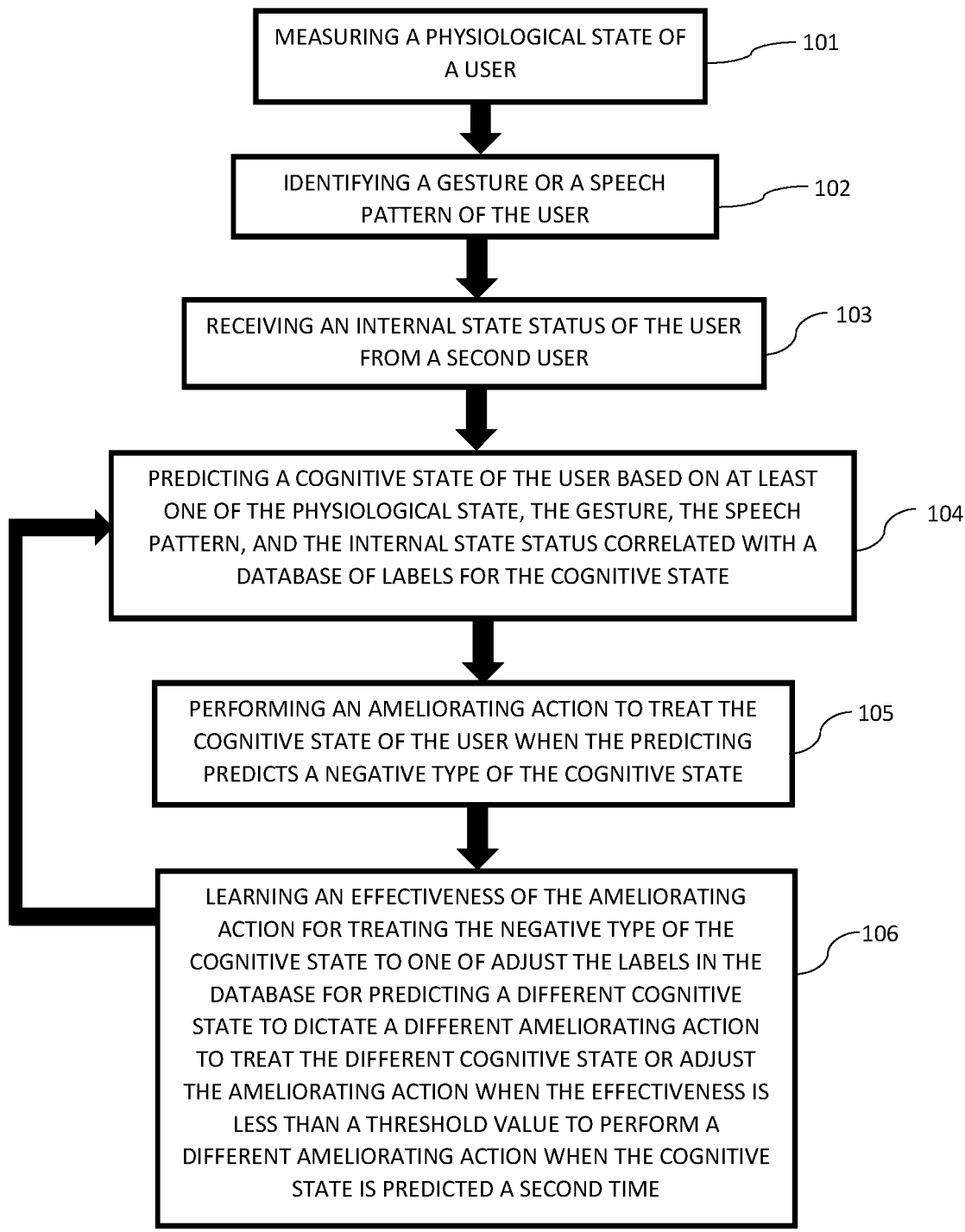
FIG. 1 exemplarily shows a high-level flow chart for a cognitive state amelioration method 100.

The invention will now be described with reference to FIGS. 1-4, in which like reference numerals refer to like parts throughout. It is emphasized that, according to common practice, the various features of the drawings are not necessarily to scale. On the contrary, the dimensions of the various features can be arbitrarily expanded or reduced for clarity.

With reference now to the example depicted in FIG. 1, the cognitive state amelioration method 100 includes various steps to measure physiological states via wearables, measure gestures and speech, take labels from an autistic person or their observer (e.g., caregiver, teacher, parent, etc.) about internal states of current or imminent agitation, distraction, etc., to correlate the measures with the labels in order to predict the labels in order to trigger an ameliorative action (e.g., a "transient squeeze") via a piece of furniture, clothing, cuff, shoe, electrical stimulator, or other sensory input. As shown in at least FIG. 2, one or more computers of a computer system 12 according to an embodiment of the present invention can include a memory 28 having instructions stored in a storage system to perform the steps of FIG. 1.

Thus, the cognitive state amelioration method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 2-4) may be implemented in a cloud environment 50 (see e.g., FIG. 3), it is nonetheless understood that the present invention can be implemented outside of the cloud environment.

In step 101, a physiological state of a user is measured via wearables, cameras, an article of clothing, a piece of furniture, sensors, etc. capable of measuring physiological data such as heart rate, respiration, skin temperature, biometric data, etc.

In step 102, a gesture(s) or a speech pattern(s) of the user are identified using sensors or the like.

In step 103, an internal state status of the user is received from a second user. For example, an observer, a teacher, a caregiver, a parent, etc. of an autistic user can input the internal state status (as they perceive) of the user such as if there is imminent agitation for the user, discomfort, distractions, etc. (i.e., a status likely indicating a negative type of cognitive state of the user).

In step 104, a cognitive state of the user is predicted based on at least one of the physiological state, the gesture, the speech pattern, and the internal state status is correlated with a database of labels for the cognitive state corresponding to the factors. For example, if the physiological state indicates an elevated heart rate, the gesture identified indicates restlessness, the internal state status is "imminent agitation" received from the second user, and a restless/agitated cognitive state can be correlated as the label in the database associated with the measured factors. Each type of label can carry a weight with the label associating a degree or severity of the cognitive state. For example, the "restless/agitated" label can be a "moderate" negative label for a cognitive state while an "emotionally unstable" label could be a more "severe" negative label requiring different types of ameliorating actions (as described later).

In other words, the cognitive state of the user is predicted based on one or a plurality of inputs describing the user correlated with parameters associated with cognitive state labels in a database.

The cognitive state can further be predicted based on a cohort of users having similar traits to the user. Alternatively, the labels can be categorized for different cohorts of users. For example, labels for Attention Deficit Hyperactivity Disorder (ADHD) users can be categorized differently from Obsessive Compulsive Disorder (OCD) users even if the inputs are similar (i.e., ADHD and OCD users can exhibit similar inputs which indicate different cognitive states).

In the alternative, the database can include two types of labels, with one being a "negative type" of a cognitive state and the second being a "neutral or positive type" of a cognitive state that is correlated with the inputs. Therefore, the cognitive state of the user is predicted as being one of the negative type which can trigger an amelioration action (as described later) or a neutral or positive type that does not trigger an action. By the same token, the state can be detected in real-time such that a user that is trending from a positive state to a negative state can have an amelioration action performed on them to prevent the user from reaching the negative state even if the negative state has not yet been predicted.

In step 105, an ameliorating action to treat (i.e., to reduce the symptoms, calm the user, provide a therapeutic effect to change the user's cognitive state to a positive cognitive state) when the predicting predicts a negative type of the cognitive state. It is noted that "negative" and "positive" refer to a cognitive state that is harmful and not harmful to the user, respectively. For example, a negative state could be a user with autism (ADHD, OCD, anxiety, claustrophobia, etc.) being agitated (i.e., autistic individuals can become agitated in classroom settings when required to listen to others or wait their turn) in a classroom setting while others are tasked with reading passages from a book aloud. The autistic user would benefit from their cognitive state being treated (or changed) via the ameliorating action such that the user is no longer agitated and can benefit from the group reading session in the classroom. That is, a negative type of the cognitive state of the user triggers an ameliorating action to diffuse, treat, provide therapy, change, etc. the cognitive state of the user.

The ameliorating action can include, for example, furniture (e.g., a "squeeze chair") that provides a therapeutic squeeze, a transient squeeze, a gentle cupping, etc. of the user (i.e., a user being held in a therapeutic manner can change a user's cognitive state). Alternatively, the ameliorating action can be performed by clothing, a cuff, shoes, an electrical stimulator, or other sensory devices that can perform a sensory stimulation to (on) the user to change his cognitive state. Obviously, a person of skill in the art can selectively choose a device to couple with the method 100 capable of outputting the ameliorating action. Further, the ameliorating action can be activated automatically or via a switch activated by a user.

In step 106, the invention further includes learning an effectiveness of the ameliorating action for treating the negative type of the cognitive state to one of: (1) adjust the labels in the database for predicting a different cognitive state to dictate a different ameliorating action to treat the different cognitive state more effectively; or (2) adjust the ameliorating action when the effectiveness is less than a threshold value to perform a different ameliorating action when the cognitive state is predicted a second time (i.e., a different ameliorating action is taken when the same cognitive state is predicted again).

That is, an effectiveness of the ameliorating action for treating the negative type of the cognitive state is machine learned to adjust the labels in the database for predicting a different ameliorating action that is more effective for treating the cognitive state. For example, if the furniture exerting a transient squeeze on the user has no effect, a different type of action is taken the next time step 105 is triggered for the same predicted cognitive state.

Alternatively, the cognitive state can be predicted more accurately (i.e., machine learning) and the labels are adjusted to classify different cognitive states based on the effectiveness of the ameliorating action. For example, if the ameliorating action has no effect (or little effect) on the user's cognitive state, the labels are adjusted to change the cognitive state predicted such that a different action is taken. Therefore, the labels for predicting the cognitive state of the user are continuously updated such that more accurate cognitive states are predicted for the individual.

Further, the system learns if a user voluntarily/manually activates a switch to perform the ameliorating action. That is, the system learns for that specific user the condition for which the user determined that the ameliorating action should be executed.

By way of example, a student with autism attends a school. The student wears a heart rate and respiration monitor. These measurements are recorded to the cloud (i.e., step 101). An application is used by the student and his or her teachers to press specific indicators at specific times that an internal or observable state is entered, which in the future may better be avoided for the student's benefit, or that of the class, etc. (i.e., step 103). The method learns (i.e., steps 104-106) which measurements predict the labels, and the output is validated by the continued inputs from student and teacher. After some period of validation (optionally), the invention is coupled to a sensory input device, for example, a chair which the student sits in which has actuators, inflators, etc. to squeeze (manipulate, etc.) the student's torso (i.e., an ameliorating action). It is noted that this has been shown to be calming and therapeutic to those on, for example, the Autism spectrum. When a cognitive state is predicted, and the method indicates a possible negative outcome, intervention is automatically provided via the chair, and the therapeutic value of the input is assessed statistically by measuring if the outcome is avoided.

Thus, a cognitive state of a user can be predicted based on a plurality of inputs and an ameliorating action can be taken to treat the cognitive state (i.e., change the negative type of cognitive state to a positive type). Further, the prediction of the cognitive state can be improved through machine learning by modifying the labels used to predict the cognitive state in order to provide a better prediction in order to provide a more effective ameliorating action. Also, the type of ameliorating action taken as a result of the ameliorating action can be improved by learning the effectiveness of the ameliorating action in order to take a different (more effective) ameliorating action the next time the same cognitive state is predicted.

It is noted that the "different" ameliorating action may be a truly different (qualitative) type of action or can be the same ameliorating action performed at a different level/amplitude (i.e., quantitative).

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
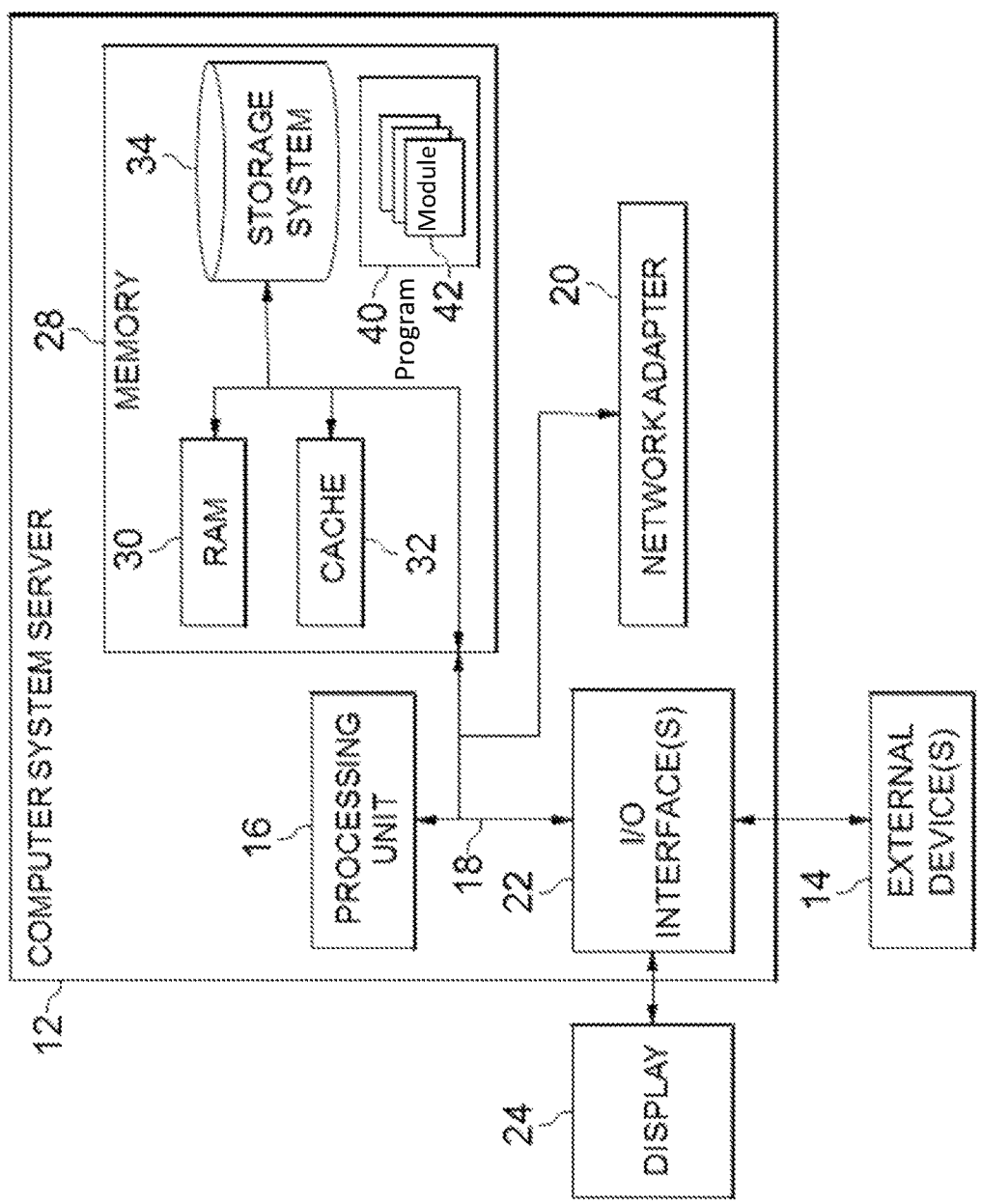
FIG. 2 depicts a cloud computing node 10 according to an embodiment of the present invention.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 2, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that are accessible by computer system/server 12, and they includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
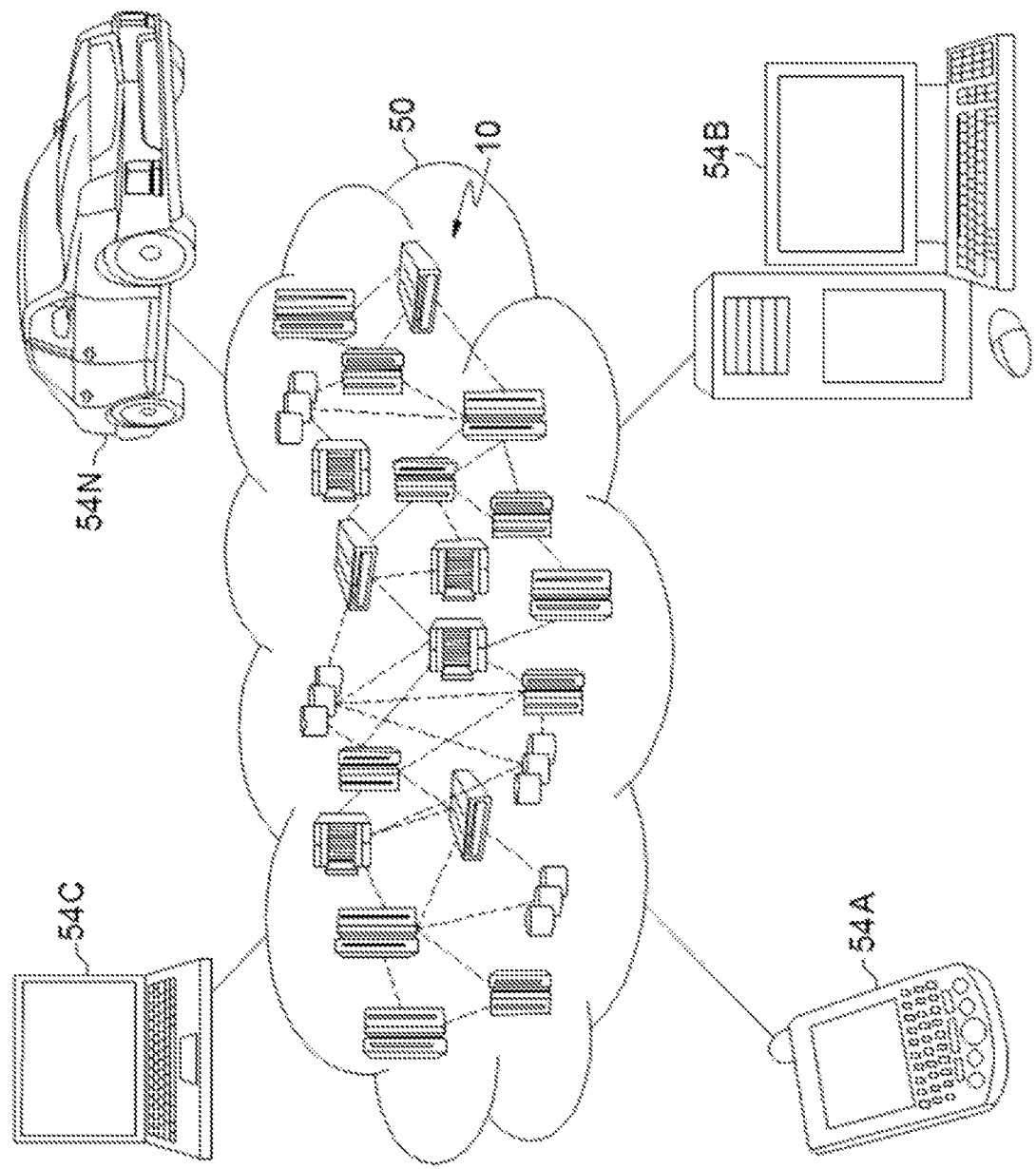
FIG. 3 depicts a cloud computing environment 50 according to an embodiment of the present invention.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
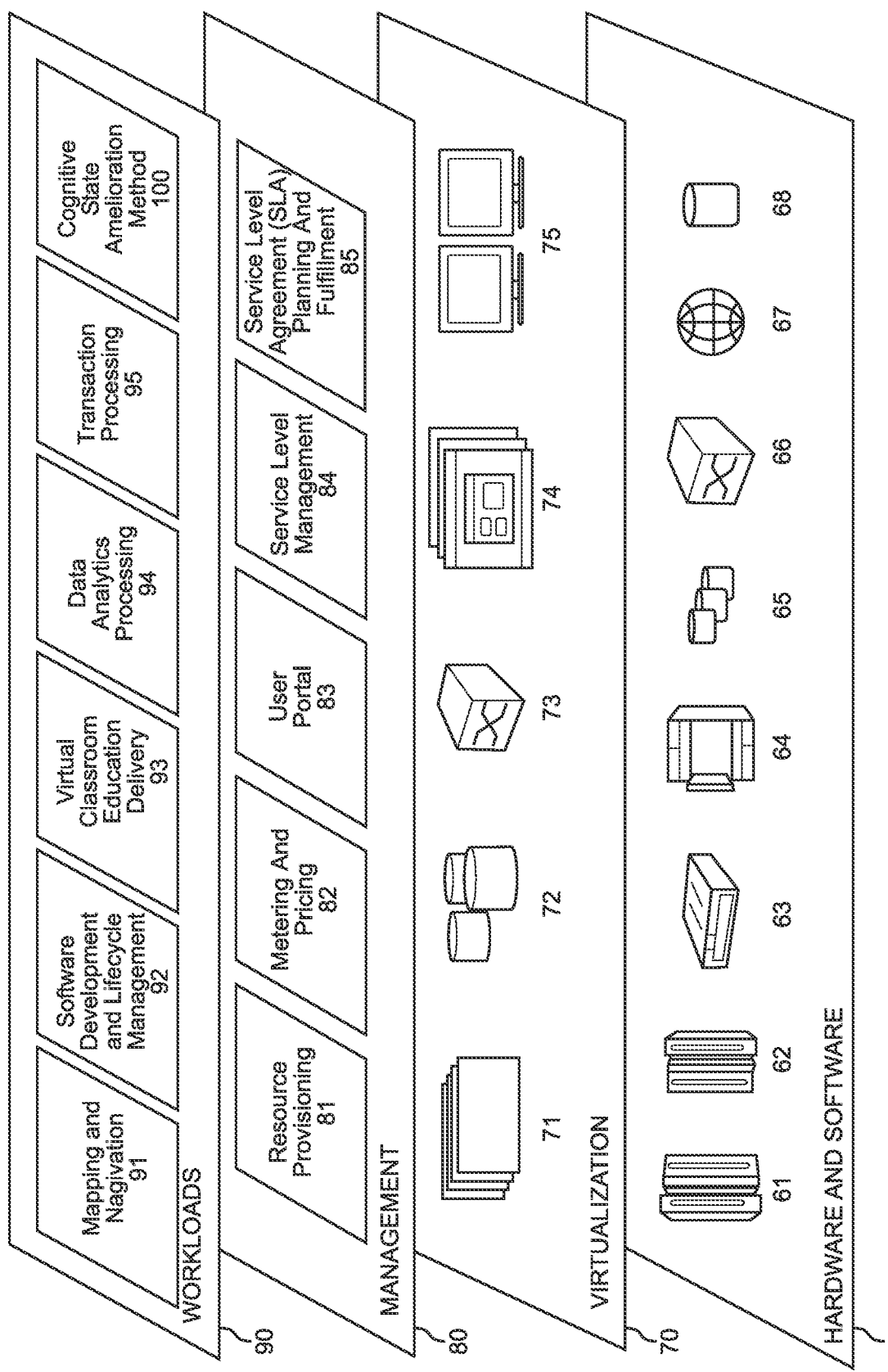
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the cognitive state amelioration method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented cognitive state amelioration method that interacts with a cloud computing environment server, the method comprising:
    predicting, via a cloud computing environment comprising a server and a second computing device that communicates with the server, a cognitive state of a user based on each of a relation of the user to a cohort of users, a plurality of inputs including a physiological state of the user, a gesture of the user, a speech pattern of the user, and an internal state status of the user received from a second user, the cognitive state being predicted by comparing the plurality of inputs with labels in a database for categorizing the plurality of inputs to the cognitive state;
    wherein the labels include two types of labels, with a first being the negative type of the cognitive state and a second being a neutral or a positive type of the cognitive state that is correlated with the plurality of inputs,
    wherein each of the labels carries a weight with the label that associates a degree or severity of the cognitive state,
    performing, via a device having physical contact with the user and connected to the cloud computing environment server and based on a user activation of a switch, a first ameliorating action based on a command from the cloud computing environment server to treat the cognitive state of the user when a result of the comparison with the database is the negative type of the cognitive state, the first ameliorating action being paired with the degree or the severity of the cognitive state and dictating a type of the first ameliorating action according to the degree or the severity of the cognitive state; and
    learning, via the cloud computing environment comprising the server and the second computing device that communicates with the server, a value of an effectiveness of the first ameliorating action for treating the negative type of the cognitive state to predict a different cognitive state, thereby to dictate a different ameliorating action as a second ameliorating action to treat the different cognitive state more effectively by increasing the value of the effectiveness,
    wherein the first ameliorating action is adjusted when the value of the effectiveness is less than a threshold value by adjusting labels in a database that are a basis to predict the cognitive state, thereby to cause the second ameliorating action to be performed when the cognitive state is predicted a second time, and
    wherein when the second ameliorating action is performed, the label of the cognitive state is adjusted to a different type of cognitive state such that the adjusted label of the cognitive state is correctly predicted a next time.

2. A computer program product for cognitive state amelioration, the computer program product comprising a computer-readable storage medium having program instructions embodied therewith, the program instructions executable by a computer to cause the computer to perform:
    predicting, via a cloud computing environment comprising a server and a second computing device that communicates with the server, a cognitive state of a user based on each of a relation of the user to a cohort of users, a plurality of inputs including a physiological state of the user, a gesture of the user, a speech pattern of the user, and an internal state status of the user received from a second user, the cognitive state being predicted by comparing the plurality of inputs with labels in a database for categorizing the plurality of inputs to the cognitive state;
    wherein the labels include two types of labels, with a first being the negative type of the cognitive state and a second being a neutral or a positive type of the cognitive state that is correlated with the plurality of inputs,
    wherein each of the labels carries a weight with the label that associates a degree or severity of the cognitive state,
    performing, via a device having physical contact with the user and connected to the cloud computing environment server and based on a user activation of a switch, a first ameliorating action based on a command from the cloud computing environment server to treat the cognitive state of the user when a result of the comparison with the database is the negative type of the cognitive state, the first ameliorating action being paired with the degree or the severity of the cognitive state and dictating a type of the first ameliorating action according to the degree or the severity of the cognitive state; and
    learning, via the cloud computing environment comprising the server and the second computing device that communicates with the server, a value of an effectiveness of the first ameliorating action for treating the negative type of the cognitive state to predict a different cognitive state, thereby to dictate a different ameliorating action as a second ameliorating action to treat the different cognitive state more effectively by increasing the value of the effectiveness, wherein the first ameliorating action is adjusted when the value of the effectiveness is less than a threshold value by adjusting labels in a database that are a basis to predict the cognitive state, thereby to cause the second ameliorating action to be performed when the cognitive state is predicted a second time, and wherein when the second ameliorating action is performed, the label of the cognitive state is adjusted to a different type of cognitive state such that the adjusted label of the cognitive state is correctly predicted a next time.

3. A cognitive state amelioration system, said system comprising:

a processor; and a memory, the memory storing instructions to cause the processor to perform:

predicting, via a cloud computing environment comprising a server and a second computing device that communicates with the server, a cognitive state of a user based on each of a relation of the user to a cohort of users, a plurality of inputs including a physiological state of the user, a gesture of the user, a speech pattern of the user, and an internal state status of the user received from a second user, the cognitive state being predicted by comparing the plurality of inputs with labels in a database for categorizing the plurality of inputs to the cognitive state;

wherein the labels include two types of labels, with a first being the negative type of the cognitive state and a second being a neutral or a positive type of the cognitive state that is correlated with the plurality of inputs, wherein each of the labels carries a weight with the label that associates a degree or severity of the cognitive state, performing, via a device having physical contact with the user and connected to the cloud computing environment server and based on a user activation of a switch, a first ameliorating action based on a command from the cloud computing environment server to treat the cognitive state of the user when a result of the comparison with the database is the negative type of the cognitive state, the first ameliorating action being paired with the degree or the severity of the cognitive state and dictating a type of the first ameliorating action according to the degree or the severity of the cognitive state; and learning, via the cloud computing environment comprising the server and the second computing device that communicates with the server, a value of an effectiveness of the first ameliorating action for treating the negative type of the cognitive state to predict a different cognitive state, thereby to dictate a different ameliorating action as a second ameliorating action to treat the different cognitive state more effectively by increasing the value of the effectiveness, wherein the first ameliorating action is adjusted when the value of the effectiveness is less than a threshold value by adjusting labels in a database that are a basis to predict the cognitive state, thereby to cause the second ameliorating action to be performed when the cognitive state is predicted a second time, and wherein when the second ameliorating action is performed, the label of the cognitive state is adjusted to a different type of cognitive state such that the adjusted label of the cognitive state is correctly predicted a next time.

4. The computer-implemented cognitive state amelioration method of claim 1, wherein the first ameliorating action includes causing a piece of furniture to perform a therapeutic squeeze of the user.

* * * * *